United States Patent

Lentz

[15] 3,649,832
[45] Mar. 14, 1972

[54] FILM IDENTIFICATION APPARATUS

[72] Inventor: Allen R. Lentz, Pittsford, N.Y.
[73] Assignee: Eastman Kodak Company, Rochester, N.Y.
[22] Filed: Aug. 5, 1970
[21] Appl. No.: 61,126

[52] U.S. Cl. ..............................................250/67, 250/68
[51] Int. Cl. .......................................................G03b 41/16
[58] Field of Search ...............................................250/67, 68

[56] References Cited

UNITED STATES PATENTS 3,296,437    1/1967    Meschan.................................250/67
3,488,753    1/1970    Tone........................................250/67

*Primary Examiner*—James W. Lawrence
*Assistant Examiner*—C. E. Church
*Attorney*—Walter O. Hodsdon and Robert F. Crocker

[57] ABSTRACT

Apparatus including an illuminable tongue supporting an information-bearing card for insertion into a cassette for the formation of a latent image of the information on a portion of a photographic film sheet contained within the cassette. The cassette includes a cavity adjacent the film portion that is to receive the information and a slot positioned along a portion of one edge of the cassette to permit entry of the tongue into the cavity. In the slot area the cassette is made light tight by an openable flexible light lock, such as interlocking flaps. The apparatus includes the improvement of a sleeve positioned about and slidably connected to the tongue to maintain the light lock open and isolated from the tongue as the tongue is relatively moved into the cassette so that rubbing between the tongue and the light lock is eliminated during the major portion of the relative movement of the tongue into the cassette. In addition increased image resolution is obtained by adapting the tip of the tongue when in the cassette to deflect away from the film so that intimate contact between the card and the film is ensured.

12 Claims, 4 Drawing Figures

ALLEN R. LENTZ
INVENTOR.
ATTORNEYS

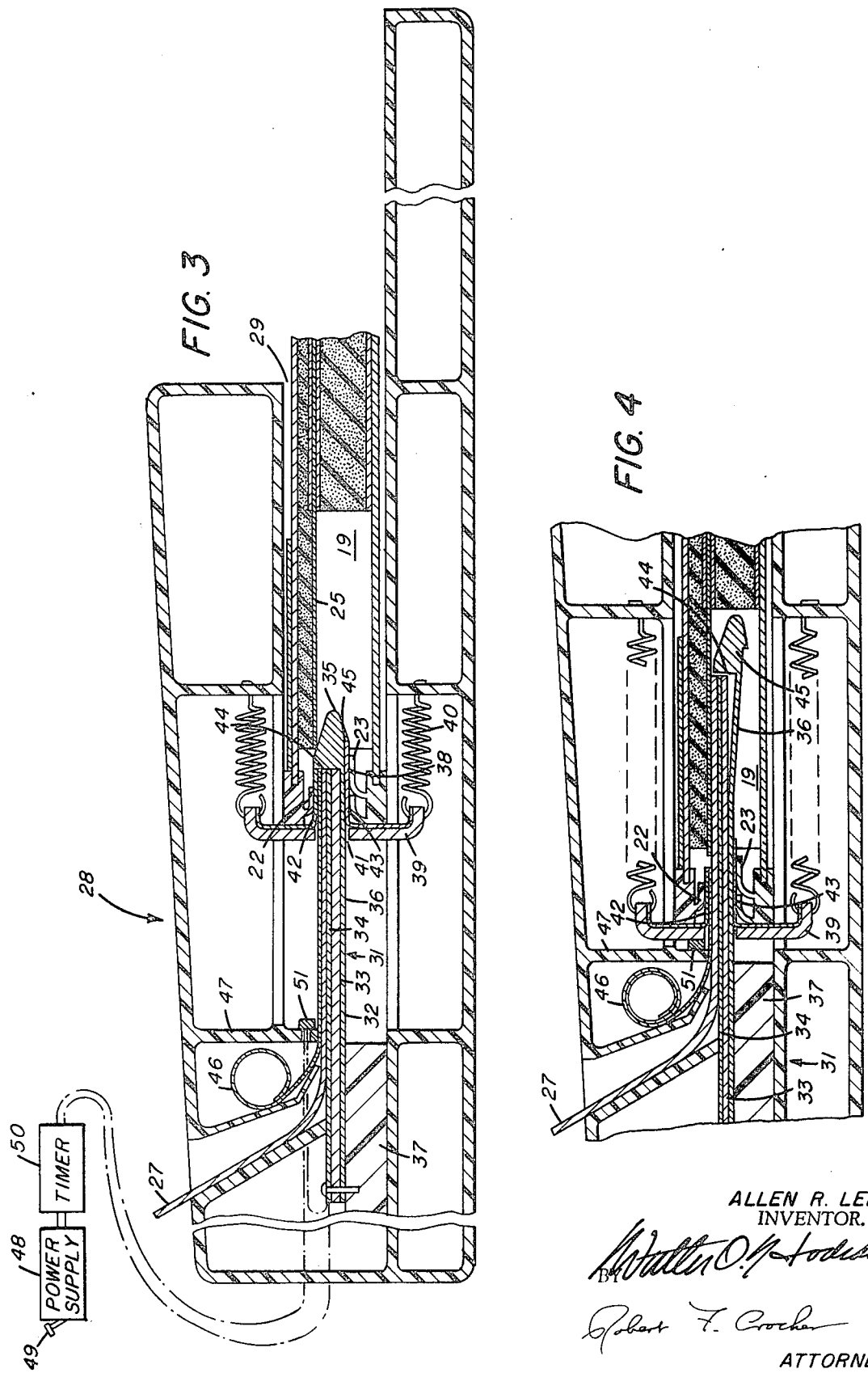

FILM IDENTIFICATION APPARATUS

BACKGROUND OF THE INVENTION

This invention relates to an apparatus for transferring information to radiation-sensitive sheets and more particularly for transferring a latent image of information to a portion of a photographic film enclosed within a container.

In the use of X-rays for medical purposes it is common practice to have patient identification (ID) information placed at an edge or corner of the X-ray to permit the physician to have the information readily available while viewing the X-ray. Although ID information may be placed on a strip and adhesively secured to the X-ray sheet, it is preferred to have the image photographed on the X-ray to prevent loss of identification by inadvertent removal of the strip from the sheet. Various approaches have been suggested for photographing ID information on to an X-ray sheet and one which works quite satisfactorily is disclosed in U.S. Pat. No. 3,488,753. In this approach an illuminable tongue and a card with ID information are inserted through a slot in a cassette containing an X-ray sensitive film. The tongue and card are positioned adjacent a corner of the film and upon energization of the tongue a latent image of the ID information is formed on the film. After development of the X-ray film the ID information is viewable along with the X-ray of the patient.

According to the aforementioned patent, the cassette is adapted to be handled in a white light environment by employing in the slot area a flexible light lock, which is partable by the tongue when it is slidably inserted into the cassette. While this arrangement operates quite satisfactorily, a problem arises in that over the course of time, with reuse of the tongue and cassette, the rubbing between the light lock elements and the tongue tends to wear the light lock so that it loses its light exclusion properties. In addition, the rubbing action generates minute plastic "dirt" particles and dust from the light lock elements which can contaminate the sensitized film and thereby reduce the clarity of the image produced. Another problem with the apparatus disclosed in the patent is that the use of a transparent plastic sheet about the tongue to facilitate insertion of the tongue into the cassette prevents intimate surface contact between the ID card and the film. This results in reduced resolution of the formed image since the radiation which is to expose the sensitized sheet is somewhat dispersed when it travels through the plastic medium.

Although an embodiment of the invention will be described with the use of an illuminable tongue as the radiation source for the creation of a latent image of the information on the film, it should be appreciated that other photographic systems that have the problem of wear caused by rubbing between an insertable member and a flexible light lock of a film container will also find this invention to be useful. For example, in U.S. Pat. No. 3,296,437 filed in the name of Meschan, a system is disclosed wherein an I.D. card is inserted into a slot of a film container and the same X-ray source used to photograph both the patient and the I.D. information. In this patent it is taught that to overcome the problem of wear between the slot's flexible light lock and the I.D. card the container may be modified to include a replaceable light lock to increase the effective life of the container. However, a rather complex container is required and valuable time may be expended to replace the light lock.

It is an object of this invention to provide improved means for increasing the effective life of a reuseable film container having a slot for receiving a member to be inserted into the container for the transfer of information to a film positioned within the container.

SUMMARY OF THE INVENTION

In accordance with the present invention there is provided an improved device for use with an element having information placed thereon for transfer to a radiation-sensitive sheet positioned in a container. The container includes a slot for receiving the element and openable flexible closure means positioned adjacent the slot for preventing light from entering the container through the slot. The device includes means positioned adjacent to and slidably movable with respect to the element for maintaining the slot closure means open and isolated from the element so that rubbing between the element and the slot closure means is eliminated during the major portion of the relative movement of the element into the container.

The invention further comprises an improved information-bearing member for insertion into a container adjacent a portion of a sensitized sheet that is to receive an image of the information. The member comprises a carrier for supporting an information-bearing element wherein the carrier includes at its leading end a deflectable tip which, when in the container, may deflect away from the sheet to permit intimate contact between the information-bearing element and the sheet.

The subject matter which is regarded as my invention is particularly pointed out and distinctly claimed in the concluding portion of this specification. The invention, however, as to its organization and operation, together with further objects and advantages will best be understood by reference to the following description, taken in conjunction with the accompanying drawings.

BRIEF DESCRIPTION OF THE DRAWINGS

FIG. 3 is a cross-sectional view taken on the line 3—3 of the embodiment shown in FIG. 2 and showing the insertable member and cassette in an initial insertion position.

FIG. 4 is a view similar to that of FIG. 3 with various details omitted and showing the insertable member in position for applying information on a portion of a sensitized sheet in the cassette.

DESCRIPTION OF THE PREFERRED EMBODIMENT

Figure 1:
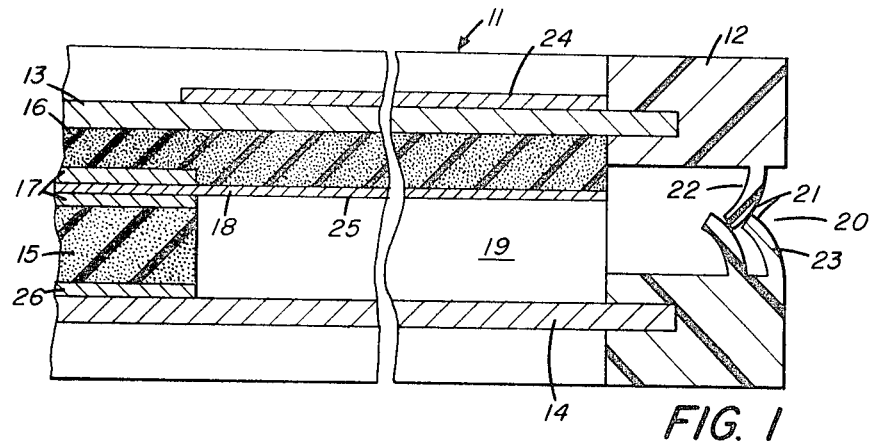
FIG. 1 is a fragmentary cross-sectional view of a film-containing cassette for use with one embodiment of the present invention.
Figure 2:
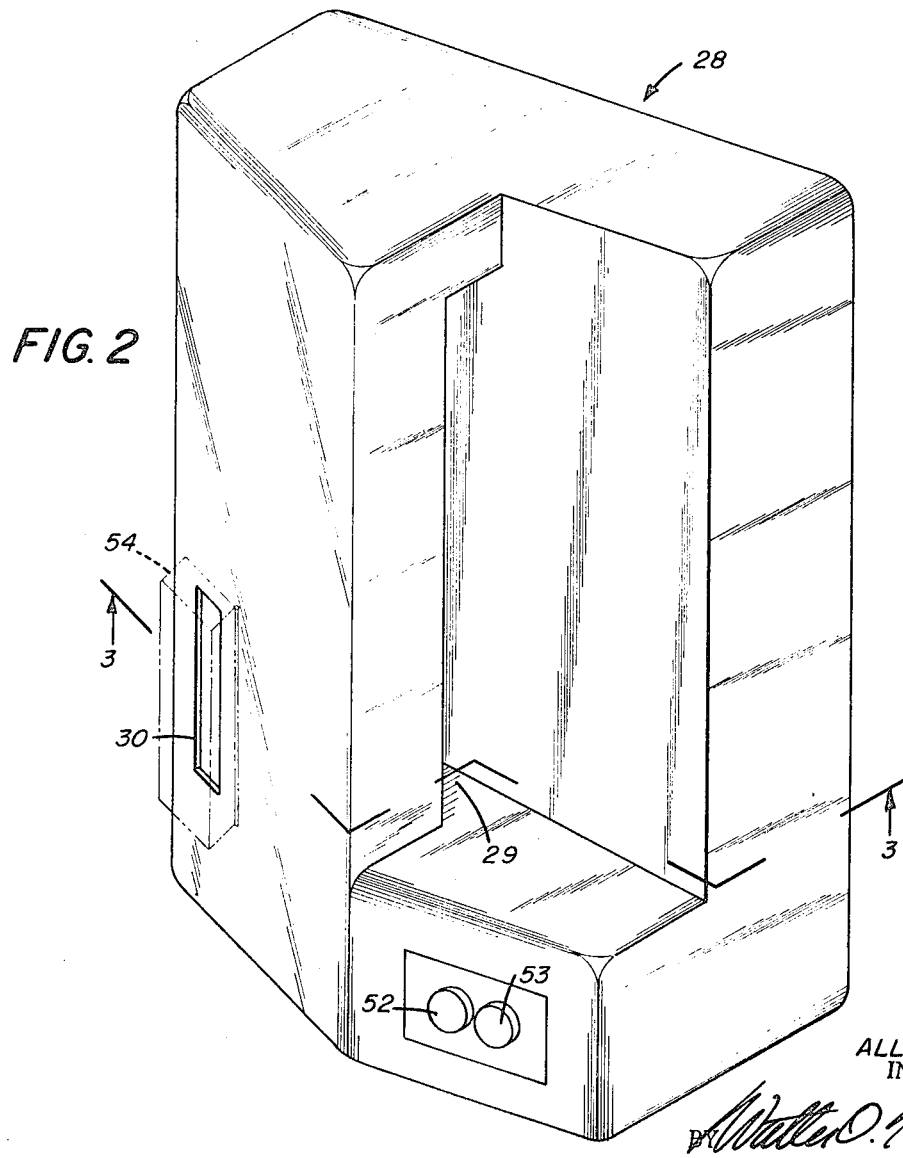
FIG. 2 is a perspective view of the housing of one embodiment of the invention.

Referring now to the drawings wherein like numbers refer to similar parts there is shown in FIG. 1 for use with one embodiment of the present invention a cassette 11 of the general type disclosed in U.S. Pat. No. 3,466,440. The cassette 11 includes a peripheral frame 12 and a pair of opposed opaque panels 13, 14 whose edges are embedded in the frame. Connected to the inner faces of the opaque panels 14, 13 are compressible foam pads 15, 16, respectively. As shown in FIG. 1 the pads are of unequal thickness with pad 15 thicker than pad 16. Between the foam pads there is positioned a pair of intensifying screens 17 with a radiation-sensitive film 18 in turn positioned between the screens 17. The film may be of the type that is particularly sensitive to X-rays. In the preferred embodiment, pad 15 and intensifying screens 17 are cutout at or near one corner of the cassette 11 to form a cavity 19 adjacent the portion of the film which is to receive the identification information. Along a portion of one edge of the cassette adjacent the cavity 19, there is formed in the frame 12 a slot 20 which allows access to the cavity from outside the cassette. To permit handling of the cassette in a white light environment the cassette must be light tight and for this purpose a flexible light lock 21 is employed in the area of the slot. The light lock 21 as shown in FIG. 2 is comprised of interlocking upper and lower flexible flaps 22, 23 integrally molded with the cassette although it should be appreciated that other flexible media could be used such as velvet, black sponge rubber, or the like. The cassette further includes a lead foil 24 secured to panel 13 in the ID area of the cassette and which is to be used to block exposure of the ID portion 25 of the film by the X-rays which are used to photograph the patient. At the back of the cassette there may be positioned a lead foil shield 26 to limit exposure of the film from backscatter effects.

In practice, the patient is first positioned between an X-ray source and the cassette. The X-rays passing through the patient expose most of the film except for the ID area of the film blocked off by lead foil 24. The technician then takes the cassette along with a rectangular ID card 27 having the pertinent information printed, typed or handwritten thereon to the apparatus shown in FIGS. 2–4 for the transfer of the information to the ID area 25 of the film. The card is preferably transparent with the information formed with opaque indicia. Translucent cards such as 3 × 5 pasteboard cards of the type normally used in card files may also be used.

The improved apparatus forming one embodiment of the invention is of the general type disclosed in the aforementioned U.S. Pat. No. 3,488,753.

The apparatus includes a housing 28 which has a cassette-receiving passage 29 and tapered I.D. card slot 30. In the rear portion of passage 29 there is positioned an illuminable tongue 31 which is adapted to be inserted through slot 20 into cavity 19 of the cassette. The tongue 31 is further adapted to support and introduce ID card 27 into the cassette in intimate contact with film portion 25 so that a latent image of the ID information may be transferred to the film upon energization of the tongue. If necessary, to prevent ambient light from being conducted by the card into the housing and possibly fogging the film, a pivotable cover 54 may be attached to the housing over the card and card slot.

The tongue includes a carrier member 32, a panel lamp support 33 and an illuminable panel 34.

Carrier member 32 is comprised of a tapered tip 35 and a flexible flat elongated body portion 36 integrally formed with the tip. In order to eliminate interference between tip 35 and the film and to permit intimate contact between card 27 and the film, the tip, when in the cassette, is adapted to deflect away from the film. This may be accomplished by molding or machining the body portion 36 with a slight curvature so that when the carrier member 32 is unsupported at the tip end it will deflect in the desired direction. The carrier member is formed from a low dirt-generating material such as a glass filled Teflon and molybdenum disulfide composite or mixture known as TGM so that upon introduction of the tongue into the cassette rubbing of the tip against the flexible flaps generates only a very minimum amount of "dirt." This material also has a low coefficient of friction and helps to reduce the force required for inserting the tongue into the cassette.

Positioned on the body portion 36 of carrier member 32 is a flat elongated rigid panel lamp support 33. The panel support 33 is formed of stainless steel and is of slightly greater width than that of the body portion 36 so that it extends beyond the sides of the body portion. Positioned on the panel lamp support and having about the same width as the body portion is a flat illuminable light panel 34. Light panel 34 may be of any commercially available type which, upon energization, produces a suitable low level of infrared energy. The low level of infrared energy is preferable because it provides a more uniform exposure of the commercially available X-ray films. The light panel in the preferred embodiment is an electroluminescent panel lamp which is electrically coupled to an appropriate power supply described below.

The light panel 34, panel support 33 and body portion 36 are secured to the housing by connecting the end opposite the tip to base 37 by suitable means, such as a rivet.

In order to overcome the problem of wear of the light lock flaps caused by repeated rubbing of the flaps with the major portion of the tongue, the apparatus includes a sleevelike member 38 positioned about the tongue and slidably movable along the sides of the panel support 33. The sleeve is adapted to be inserted into the cassette for the length of the light lock to force light lock flaps 22, 23 to rest on the sleeve and be isolated from the tongue during insertion of the tongue into the cavity. Sleeve 38 is of rectangular cross section and is supported in the housing by connection to a wall 39. Wall 39 is connected to the housing through tension springs 40 which bias the wall toward the tip end of the tongue. In order for wall 39 to be moved along the tongue, the wall has a rectangular slot at 41 that is aligned with the cavity of the sleeve. Since the sleeve 38 is supported by the housing, it in turn, when located adjacent the tip, supports the tip end of the tongue. This sleeve support of the tongue is used to maintain the carrier member 32 straight for the initial insertion into the cassette.

The leading end of sleeve 38 is beveled so that the upper sleeve element 42 is shorter than the lower sleeve element 43. As shown in FIG. 3, each of the elements 42, 43 has its leading edge in mating engagement with offset vertical abutment walls 44, 45 respectively, formed in the carrier member 32. These abutment walls serve as stops to limit further movement of the sleeve to the right. The sleeve is of such length that, when resting in this position, a tension is applied to the spring. This tension facilitates the insertion of the sleeve into the cassette by presenting to the cassette a relatively firm member which will not very readily move with the cassette as the cassette is moved into the passage 29.

Further with regard to FIG. 3 there is shown secured to the underside of upper sleeve element 42 one end of an uncoiled flexible membrane 46 which has a portion that extends along the tongue under housing wall 47. Since the membrane has a tendency to coil, wall 47 restrains this portion of the membrane from coiling. Membrane 46 is used for guiding the ID card into its correct position on the tongue.

The electrical circuitry of the apparatus provides the energy to illuminate the panel lamp 34. It includes a suitable power supply 48 which is activated by a switch 49. A timer 50 is coupled to the power supply so that energization of the panel lamp 34 is for only the minimum time necessary to properly expose the film. This time is generally less than one second. To ensure that the tongue is in correct position in the cassette for energization of the panel lamp a position contact switch 51 is coupled through a separate power supply to a light 52 on the control panel to indicate that the cassette has been moved to its innermost position in passage 29. The contact switch 51 is also coupled to the tongue's panel lamp 34 so that energization of the panel lamp 34 may not occur without depression of the contact switch 51. The control panel may also include a second light 53 which is coupled to the panel lamp 34 to indicate when exposure of the film is complete.

OPERATION

After the patient is X-rayed, the technician places the patient's ID card 27 in the card slot 30 and slides the card down the tapered slot 30 and along tongue 31 between flexible membrane 46 and panel lamp 34. The flexible membrane 46 ensures that the card will be correctly guided along the tongue. The card is moved until it is stopped by abutment wall 44 which indicates that the card is correctly positioned. The technician then inserts the cassette into passage 29 with the cassette turned so that cassette slot 20 is aligned with tongue 31. As the cassette is moved along the passage 29 it is guided by the sides of the passage. Initial contact of the tongue with the cassette is made by tip 35 which parts flexible flaps 22, 23 and causes the flaps to ride up the tapered sides of the tip. Wear of the flaps and "dirt" generation caused by the rubbing between the flaps and the tip is at a minimum because of the tapered configuration of the tip, the forming of the tip with low dirt-generating material and the short length for which the flaps are in contact with the tip. Movement of the cassette into the passage results in the seating of the upper and lower flaps 22, 23 on the upper and lower sleeve elements 42, 43 respectively. In this position, as shown in FIG. 3, the light lock 21 is maintained open and isolated from the tongue. The cassette is then moved against the spring biased wall 39 and further movement of the cassette and wall 39 results in the tongue being relatively moved into cassette cavity 19. Since the sleeve during this latter period of movement is moving with the cassette, there is no relative movement between the flaps and the sleeve and thus wear on the flaps is kept to a minimum. In addition, the absence of rubbing between tongue and flaps during the major portion of the insertion results in a substantial reduction in "dirt" generation. This permits a higher quality image to be formed on the ID portion of the film since "dirt" contamination of the film is also minimized.

In the position shown in FIG. 4 the cassette and slidable wall 39 have reached their respective innermost positions in the passage. The sleeve and flexible membrane 46 which is secured to it have moved with the cassette to uncover the ID card 27 and the panel lamp 34. The flexible membrane 46 is stored in this position by further coiling about its free end. During movement of the sleeve away from the tip the front portion of carrier 32 is left unsupported and tends to curve to its normal shape causing the tip to deflect away from the film. The rigid panel support 33 remains straight and supports the ID card in intimate contact with the film portion 25. The panel support 33 also supports the panel lamp in intimate contact with the ID card 27.

The apparatus is now in position for transferring a latent image of the card's information to the ID portion of the film. This is indicated to the technician through control light 52 which is energized upon depression of contact switch 51 by slidable wall 39. Depression of contact switch 51 also closes one opening in the panel lamp circuit which permits activation of the power supply 48. Switch 49 is then closed by the technician and the panel lamp energized for the period controlled by the timer 50. With power being supplied to the panel lamp the second control light 53 on the housing is energized to indicate that the circuit is completed and the panel lamp illuminated. After the panel lamp has exposed the ID portion of the film, timer 50 cuts off the power in the panel lamp circuit and the second control light 53 goes out indicating that the cassette may now be removed and that a latent image has been transferred to the ID portion of the film.

As the cassette is removed from the tongue the wall 39 and sleeve 38 return to their initial positions and the apparatus is ready for the next cassette. The whole operation of the apparatus from insertion to removal has taken but a few seconds and a relatively high quality image is producible upon the ID portion of the film upon suitable development.

Thus it will be appreciated that applicants have developed an improved apparatus which increases the effective life of X-ray cassettes and other reuseable containers having sensitized sheets and permits higher quality image transfer to portions of the sheet supported within such containers.

The invention has been described in detail with particular reference to preferred embodiments thereof, but it will be understood that variations and modifications can be effected within the spirit and scope of the invention.

I claim:

1. In an apparatus including a member for insertion into a container for the forming of an image on a portion of a photographically sensitized sheet in said container, said container having a slot for receiving said member and openable flexible slot closure means positioned adjacent said slot for preventing light from entering said container through said slot, the improvement which comprises:
   means included in said apparatus and positioned adjacent to and relatively slidably movable with respect to said member for maintaining said slot closure means open and isolated from said member so that rubbing between said member and said slot closure means is eliminated during the major portion of the relative movement of said member into said container.

2. The invention according to claim 1 wherein said slot closure means of said container includes an upper element and a lower element which cooperate to close said slot and wherein said means for maintaining said slot open includes a first element for maintaining said upper element in the open position and a second element positioned in spaced relationship from said first element for maintaining said lower element in the open position, said first and second elements being spaced sufficiently apart so that said member may be positioned therebetween.

3. The invention according to claim 1 wherein said means for maintaining said slot open comprises a sleeve positioned about said member.

4. The invention according to claim 1 wherein said member supports an element having the information to be applied to said sheet and said member includes means for transferring a latent image of said information to said sheet.

5. The invention according to claim 1 wherein said member supports an element having the information to be applied to said sheet and said member includes a deflectable tip at its leading end, said tip being adapted to deflect away from said sheet when in said container to permit intimate contact between said information element and said sheet, and said apparatus includes means for supporting said tip in its nondeflected position for entrance into said container.

6. The invention according to claim 1 wherein said member includes
   a carrier element having a flat body portion and a tapered tip, said tip being adapted to curve away from said sheet when in said container; a flat rigid panel lamp support positioned on said carrier member; and a flat panel lamp positioned on said panel support for exposing said portion of said sheet.

7. The invention according to claim 6 wherein said apparatus further includes means for supporting said tip in its nondeflected position for entrance into said container.

8. In an apparatus including a member for supporting an information bearing element for insertion into a container for applying information on a portion of a photographically sensitized sheet in said container, said container having a slot for receiving said member and openable flexible slot closure means positioned adjacent said slot for preventing light from entering said container through said slot, the improvement which comprises:
   a deflectable tip at the leading end of said member, said tip being adapted to deflect away from said sheet when in said container, and said apparatus further including means for supporting said tip in its nondeflected position for entrance into said container.

9. The invention according to claim 8 wherein said tip-supporting means is positioned adjacent said member and relatively movable along said member so that when said tip-supporting means is located adjacent the leading end of said member said tip is supported in the nondeflected position and when said tip-supporting means is located remote from said leading end said tip is deflected away from said sheet.

10. The invention according to claim 9 wherein said tip-supporting means is comprised of a sleeve positioned about said member.

11. The invention according to claim 8 wherein said member includes
   a carrier element having a flat body portion from which said tip extends; and
   a flat rigid support element positioned between said carrier element and said information-bearing element for supporting said information-bearing element in intimate contact with said sheet while said tip is in the deflected position.

12. A device for use with an element having information placed thereon for transfer to a photographically sensitized sheet positioned in a container, said container having a slot for receiving the information-bearing element and openable flexible slot closure means positioned adjacent said slot for preventing light from entering said container through said slot, said device comprising:
   a member of a size allowing entry into said slot, said member including a first element and a second element connected thereto and spaced from said first element so as to permit the information bearing element to be relatively slidably moved between said first and second elements, said first and second elements, said first and second elements being adapted to contact said slot closure means and to maintain said slot closure means open and isolated from said information-bearing element;

whereby said information-bearing element may be relatively slidably moved between said elements without rubbing against said slot closure means during the major portion of the relative movement of said information-bearing element into said container.

* * * * *